2,938,005

PREPARATION OF CELLULAR POLYURETHANE RESINS USING SULFATED COMPOUNDS AS EMULSIFIERS

Rudolf Bick, Leverkusen-Burrig, and Franzkarl Brochhagen, Odenthal, Bezirk Koln, Germany, assignors, by mesne assignments, to Mobay Chemical Company, Pittsburgh, Pa., a corporation of Delaware No Drawing. Filed Aug. 16, 1954, Ser. No. 450,215

Claims priority, application Germany Aug. 19, 1953

5 Claims. (Cl. 260—2.5)

The present invention relates to elastic, semi-rigid and rigid foams and to a process of producing same.

It is known in the art that elastic, semi-rigid and rigid foams can be prepared by reacting at least one polyester containing a plurality of hydroxy- and/or carboxylic acid groups with a polyisocyanate in the presence of water and in the presence of activators. The polyesters used in this reaction are preferably polyesters containing hydroxyl or carboxyl end groups; they are prepared by reacting one or more polyhydroxy organic compounds with one or more organic polycarboxylic acids; and one of these reactants is used in excess so that a polyester containing unreacted hydroxyl or carboxyl groups is obtained. The activators usually comprise an alkaline accelerator such as a tertiary amine, sodium phenolate, etc., but preferably also include water or an emulsifier and water.

In accordance with this invention, it has been found that the foaming process and product are substantially improved by adding a sulfated compound of the type hereinafter described to the activator or activator mixture used in the foaming process. The sulfated compound used is any organic compound, preferably a hydrocarbon, an alkali fatty acid salt or fatty acid ester, which contains a carbon chain of at least 10 carbon atoms and at least one sulfate radical in the molecule. Illustrative examples of suitable compounds are alkali salts of sulfated fatty acids, such as for example Turkey red oil, the sodium salt of sulfated castor oil, the corresponding derivatives of the sulfation products of other unsaturated fatty acids, such as oleic acid and linoleic acids, and also the sulfation products of the glycerides of these unsaturated fatty acids. Moreover, the sulfates of fatty alcohols containing more than 10 carbon atoms and also the alkali salts of the sulfates prepared by sulfochlorinating hydrocarbons containing more than 10 carbon atoms may be employed. In addition, it is also within the scope of the invention to use the alkali salts of sulfated alkylated aromatic hydrocarbons containing at least 10 carbon atoms in the alkyl chain. The sulfate group may occur on the aromatic nucleus and/or the alkyl chain.

The addition of these sulfated compounds, which may contain up to 55% of water, insures a more homogeneous mixing of the activator mixture, which mixture preferably contains for example, an esteramine derived from N-diethylethanolamine and adipic acid; hexahydro-dimethylaniline, sodium phenolate, omega-amino-carboxylic acids or various combinations thereof. By using these sulfated compounds alone or in combination with the activator or activator mixture in the foaming process, rigid and elastic foams are obtained which have extremely fine pores. In addition, by virtue of these additives the foam skin formed in the production of blocks remains plastic longer and the final reaction in the skin takes place later than the reaction in the core of the blocks. Therefore, it is possible to aerate the foam more completely and/or to allow the excess of carbon dioxide to escape through the skin, thus avoiding the formation of cracks.

The addition of these sulfated products to the activator or activator mixture stabilizes the latter so that it can be stored at least for a few days. Consequently, the production of foams, particularly in continuous mixing apparatus, can be safely effected.

When these sulfated organic compounds are used in combination with activators and the type of activator is varied, that is, when the activator is varied from an esteramine to an alkali metal phenolate and from the latter to hexahydro-dimethylaniline, the acceleration of the foaming process is progressively increased.

In the coating of semi-rigid materials, it is advantageous to use in the foaming composition combinations of these materials, for example, mixtures of an alkali phenolate and hexahydro-dimethylaniline, so that an initial layer is produced as rapidly as possible having the capacity to support the second foamed layer and also so that the still plastic skin of the initial layer will insure that the second layer is intimately bonded to the initial layer.

The invention is illustrated further by the following examples without being restricted thereto.

RIGID FOAMS

*Example 1*

In this example, rigid foams for producing moldings or for filling hollow spaces are prepared by a slow foaming process.

80 parts of a polyester derived from 2.5 mols of adipic acid, 0.5 mol of phthalic acid, and 4 mols of glycerol, hexanetriol or trimethylolpropane; 20 parts of a polyester derived from 1.5 mols of adipic acid, 0.5 mol of phthalic acid and 2.2 mols of butylene glycol; 10 parts of siliceous chalk, and 2 parts of an activator mixture consisting of 10 parts of Turkey red oil containing about 55% water and 1.5 parts of the esteramine from N-diethanolamine and adipic acid are intimately mixed together. To this mixture there is added, with stirring, about 48 to 50 parts of tolylene diisocyanate and the resulting reaction mixture processed in the usual manner. A rigid foam of excellent physical properties having a density of 100 kg./m.$^3$ is obtained.

The quantity of activator mixture used depends on the density desired in the rigid foam. In general, about 2 to about 10 parts of the activator mixture is required to yield a rigid foam having densities ranging from about 100 to 30 kg./m.$^3$.

*Example 2*

An activator mixture consisting of 10 parts of the sodium salt of a sulfated linoleic acid containing 55% of water and 1 part of hexahydro-dimethylaniline is used to produce a rapidly reacting composition for making rigid foams. By using from 5 to 2 parts of this mixture, foams having a density ranging from about 50 to about 100 kg./m.$^3$ can be produced.

For example, rigid foams having densities of 50 kg./m.$^3$ and 100 kg./m.$^3$ can be prepared from compositions A and B respectively.

Composition A:
    100 parts of the mixture of polyesters of Example 1
    10 parts of siliceous chalk
    5 parts of activator mixture
    60 parts of tolylene diisocyanate Composition B:
    100 parts of the mixture of polyesters of Example 1
    10 parts of siliceous chalk
    2 parts of activator mixture
    48–50 parts of tolylene diisocyanate These foams are prepared by mixing the polyesters with the chalk and then reacting the resulting product, while stirring, with the tolylene diisocyanate in the presence of the added activator mixture.

Example 3

In the production of rigid foams having densities within the limits of about 10 to about 50 kg./m.³, an activator mixture is employed consisting of 10 parts of the sodium or potassium salt of a sulfated oleic acid containing 50% by weight of water, and 1.5 parts of hexahydro-dimethylaniline.

For producing a foam having a density of between 25 and 30 kg./m.³, about 10 to 11 parts of the above activator mixture is added, with stirring, to a composition consisting of 100 parts of the mixture of polyesters of Example 1, 10 parts of siliceous chalk and 90 parts of tolylene diisocyanate, and then allowing the foaming reaction to go to completion.

The above foaming composition is particularly suitable for making small objects which must be produced in a continuous manner since the very rapid reaction permits only a short molding time.

SEMI-RIGID FOAMS

Example 4

Substantially non-inflammable, semi-rigid foamed materials, e.g. for coating, are obtained by adding to a mixture of a polyester and an organic diisocyanate about 8–10 parts of an activator mixture consisting of 5 parts of the sodium salt of a sulfated oleic acid containing 55% of water, 1 part of phenol, and 1 part of alkali metal phenolate (sodium phenolate).

For producing a semi-rigid foam having a density of 60 kg./m.³, the following composition is employed:
70 parts of a polyester from 0.5 mol of phthalic acid, 1.5 mols of adipic acid and 2.2 mols of butylene glycol
30 parts of polyester from 1 mol of adipic acid and 1.2 mols of diethylene glycol
10 parts of siliceous chalk
20 parts of trichloroethyl phosphate
5 parts of activator mixture
60 parts of tolylene diisocyanate

Example 5

A composition containing 100 parts of the polyester mixture of Example 4, 10 parts of siliceous chalk, 20 parts of trichloroethyl phosphate and 65 parts of tolylene diisocyanate is mixed with 9 parts of an activator prepared from a mixture of 4 parts of the activator mixture of Example 2 with 2.5 parts of the sodium salt of a sulfated linseed oil containing 40% water, and 3.0 parts of esteramine from N-diethylethanolamine and adipic acid. The resulting reacting product is worked up in the usual manner and a foam having a density of 30 to 50 kg./m.³ is obtained.

Example 6

For the production of semi-rigid foams having a density of from 25–100 kg./m.³, there is added to a mixture of a polyester and an isocyanate an activator consisting of 89 parts of the sodium salt of a sulfated oleic acid containing 50% of water, 10 parts of hexahydro-dimethylaniline, and 1 part of an alkali metal phenolate such as sodium phenolate.

The following composition is suitable for making a foam having a density of 30 kg./m.³:

100 parts of a mixture of polyesters according to Example 4
10 parts of siliceous chalk
20 parts of trichloroethyl phosphate
9 parts of activator
70–75 parts of tolylene diisocyanate

ELASTIC FOAMS

Example 7

100 parts of the polyester derived from 1 mol of adipic acid, 1 mol of diethylene glycol and 0.1 mol of trimethylol of propane is mixed with 35 parts of tolylene diisocyanate and to the resulting mixture is added, with stirring, 6 parts of an activator consisting of 3 parts of the sodium salt of a sulfated oleic acid containing 50% of water, 2 parts of omega-amino-caproic acid lactam, 1 part of water and 2 parts of the esteramine from adipic acid and diethylethanolamine. The reacting composition thus obtained yields an elastic foam having a density ranging from about 25 to about 50 kg./m.³.

The working examples have been restricted to the use of aqueous foaming systems including sulfated compounds in combination with alkaline activators. However, when using polyesters containing unreacted carboxyl groups or other polycarboxy compounds, a non-aqueous foaming system may be employed. Moreover, when using aqueous or non-aqueous foaming systems, it is within the broad scope of the invention to use the sulfated compounds per se, but it is preferred to use them in combination with the above mentioned alkaline activators as foams having superior physical properties are thereby obtained.

Illustrative examples of polyhydroxy compounds which may be used in the practice of this invention are polyesters prepared from the following polyhydroxy compounds: ethylene glycol, diethylene glycol, triethylene glycol, pentamethylene glycol, hexamethylene glycol, decamethylene glycol, dodecamethylene glycol, propylene glycol, 1.2-propylene glycol, 1,3-propylene glycol, butanediol-1,2, butanediol-2,3, butanediol-1,3, butanediol-1,4, isobutylene glycol, pinacol, hexanediol-1,4, pentanediol-1,5, 2-methyl-2-4-pentanediol, heptanediol-1,7, heptanediol-1,4, thiodiglycol, n-butyldiethanolamine, N,N-diethanolaniline, hydroquinonediglycol ether, transhexahydroxylene glycol, m-dihydroxybenzene, o-dihydroxybenzene, glycerol, 1,1,1-trimethylol propane, trihydroxybenzene, castor oil, erythritol, pentaerythritol, triethanolamine and mannitol, etc.

As examples of polycarboxylic acids which may be employed in the production of polyesters with these polyhydroxy compounds there may be mentioned adipic, β-methyl adipic, azelaic, fumaric, glutaric, 2-phenylglutaric, malic, maleic, malonic methyl malonic, sebacic, suberic, succinic, pimelic, 4-ketopimelic, itaconic, dehydromuconic, decane-1,10-dicarboxylic undecanedioic, ketoundecanedioic, brassylic, acetylenedicarboxylic, acetone dicarboxylic, diphenic, p-phenylenediacetic, phthalic, isophthalic, terephthalic, hexahydroterephthalic, cyclopentane-1,2-dicarboxylic, cyclopentane-1,3-dicarboxylic, cyclohexane-1,2-dicarboxylic, cyclohexane-1,3-dicarboxylic, cyclohexane-1,4-dicarboxylic, naphthalene-1,2-dicarboxylic, naphthalene-1,3-dicarboxylic, naphthalene-1,4-dicarboxylic, naphthalene-1,5-dicarboxylic, diphenylene-2,2-dicarboxylic, diphenylene-4,4'-dicarboxylic, diphenylene-2,4'-dicarboxylic, xylylene-1,4-dicarboxylic, xylylene-1,3-dicarboxylic, xylylene-1,2-dicarboxylic, camphoric, citric, tricarballylic and aconitic acids, etc.

Hydroxycarboxylic acids may also be used for the production of suitable starting polyesters. Illustrative examples of these polyesters are those obtained by polycondensation of 6-hydroxycaproic, 10-hydroxydecanoic, 12-hydroxystearic, glyceric acid, 9,10-dihydroxystearic acid, 3,12-dihydroxypalmitic acid, trihydroxy n-butyric acids, trihydroxy isobutyric acid and aleuritic acid, etc.

The above polyesters of mixtures thereof may be reacted with polyisocyanates to produce the foams of the instant invention.

Any polyisocyanate may be employed in the practice of the instant invention. Illustrative examples of these are trimethylene diisocyanate, tetramethylene diisocyanate, pentamethylene diisocyanate, hexamethylene diisocyanate, decamethylene diisocyanate, cyclopentylene-1,3-diisocyanate, 1,4-diisocyanato cyclohexane, p-phenylene diisocyanate, m-phenylene diisocyanate, the tolylene diisocyanates, the naphthalene diisocyanates, 4,4'-diphenyl propane diisocyanate, 4,4'-diphenylmethane diisocyanate, benzene-1,3,5-triisocyanate, toluene-2,4,6-triisocyanate, ethylbenzene-2,4,6-triisocyanate, monochlorobenzene-2,4,6-triisocyanate, triphenylmethane-4,4'4'''-triisocyanate and diphenyl-2,4,4'-triisocyanate, etc.

What we claim is:

1. In a process for making foams by reacting an organic polyisocyanate, water, and an organic polyester having terminal hydroxyl groups, said polyester being an esterification product of a polyhydric alcohol and a polycarboxylic acid, the improvement comprising conducting said foaming process in the presence of about 1% by weight, based on the weight of the polyester, of an anionic emulsifier selected from the group consisting of an alkali metal salt of a sulfated fatty acid containing a carbon chain of at least 10 carbon atoms and an alkali metal salt of the sulfated glyceride of a fatty acid containing a carbon chain of at least 10 carbon atoms.

2. Process of claim 1 wherein said emulsifier is the sodium salt of sulfated castor oil.

3. Process of claim 1 wherein said emulsifier is the sodium salt of a sulfated linoleic acid.

4. Process of claim 1 wherein said emulsifier is the sodium salt of a sulfated oleic acid.

5. Process of claim 1 wherein said emulsifier is the sodium salt of a sulfated linseed oil.

References Cited in the file of this patent

UNITED STATES PATENTS

| | | |
|---|---|---|
| 2,577,279 | Simon et al. | Dec. 4, 1951 |
| 2,608,536 | Sterling | Aug. 26, 1952 |
| 2,650,212 | Windemuth | Aug. 25, 1953 |
| 2,764,565 | Hoppe et al. | Sept. 25, 1956 |
| 2,787,601 | Detrick et al. | Apr. 2, 1957 |
| 2,788,335 | Barthel | Apr. 9, 1957 |

OTHER REFERENCES

Markley: "Fatty Acids," Interscience Publishers Inc., copyright 1947, pages 522 and 523.

Monsanto Tech. Bulletin No. P–144, Revised Feb. 1, 1953, Monsanto Chem. Co., Phosphate Div., St. Louis, Missouri, 5 pages (pages 1–3 relied upon).